(12) United States Patent
Shelest

(10) Patent No.: US 9,491,222 B2
(45) Date of Patent: Nov. 8, 2016

(54) SYSTEM AND METHOD FOR INTEROPERABILITY BETWEEN FLEX APPLICATIONS AND .NET APPLICATIONS

(71) Applicant: NICE-SYSTEMS LTD., Ra'anana (IL)

(72) Inventor: Vitaly Shelest, Holon (IL)

(73) Assignee: NICE-SYSTEMS Ltd., Ra'anana (IL)

( * ) Notice: Subject to any disclaimer, the term of this patent is extended or adjusted under 35 U.S.C. 154(b) by 148 days.

(21) Appl. No.: 13/798,660

(22) Filed: Mar. 13, 2013

(65) Prior Publication Data

US 2014/0280431 A1    Sep. 18, 2014

(51) Int. Cl.
*G06F 15/16* (2006.01)
*H04L 29/08* (2006.01)
*G06F 9/54* (2006.01)

(52) U.S. Cl.
CPC ............... *H04L 67/02* (2013.01); *G06F 9/548* (2013.01); *H04L 67/2823* (2013.01)

(58) Field of Classification Search
CPC . H04L 67/02; H04L 29/08072; H04L 29/06; H04L 29/08135; H04L 29/08144; H04L 29/0809; H04L 67/2823; G06F 9/548
USPC .......................................... 709/201; 719/328
See application file for complete search history.

(56) References Cited

U.S. PATENT DOCUMENTS

| | | | | |
|---|---|---|---|---|
| 8,229,969 B1* | 7/2012 | Floyd | | 707/802 |
| 8,230,417 B1* | 7/2012 | Clark | | G06F 8/61 709/220 |
| 8,392,877 B1* | 3/2013 | Chiluvuri | | 717/107 |
| 8,447,873 B1* | 5/2013 | Joyce | | G06F 9/54 709/203 |
| 8,448,161 B2* | 5/2013 | Goldman | | G06F 8/65 717/170 |
| 8,566,595 B1* | 10/2013 | Joyce | | G06F 21/335 713/175 |
| 8,745,501 B2* | 6/2014 | Krantz et al. | | 715/730 |
| 8,762,465 B2* | 6/2014 | Kim et al. | | 709/206 |
| 8,762,883 B2* | 6/2014 | Kumar et al. | | 715/808 |
| 8,775,919 B2* | 7/2014 | Hammond | | G06F 17/30 715/201 |
| 8,910,144 B1* | 12/2014 | Joyce | | G06F 9/45504 717/174 |
| 9,098,361 B1* | 8/2015 | Greenberg | | G06F 9/546 |
| 2002/0156909 A1* | 10/2002 | Harrington | | H04L 29/06 709/231 |
| 2008/0127169 A1* | 5/2008 | Malasky | | G06F 8/61 717/174 |
| 2008/0127170 A1* | 5/2008 | Goldman | | G06F 8/61 717/174 |
| 2009/0293066 A1* | 11/2009 | Low | | G06F 9/548 719/316 |
| 2010/0191700 A1* | 7/2010 | Kumar et al. | | 707/602 |
| 2010/0192166 A1* | 7/2010 | Kumar | | G06F 9/548 719/328 |
| 2011/0078607 A1* | 3/2011 | Ryan et al. | | 715/771 |
| 2011/0078670 A1* | 3/2011 | Viry | | 717/149 |
| 2011/0258623 A1* | 10/2011 | Wagner | | H04N 21/41407 718/1 |
| 2012/0023407 A1* | 1/2012 | Taylor | | G06F 9/4443 715/731 |

* cited by examiner

*Primary Examiner* — Joseph E Avellino
*Assistant Examiner* — Binod J Kunwar
(74) *Attorney, Agent, or Firm* — Pearl Cohen Zedek Latzer Baratz LLP

(57) ABSTRACT

System and method for enabling interoperability between a Flex application included in a web page and an external application. A method includes substituting the Flex application included in the web page with a container application, the container application including an external interface; loading the Flex application into the container application; generating, by the container application, a representation for at least one object in the Flex application; and facilitating a communication between the Flex application and the external application based on the representation of the object.

17 Claims, 2 Drawing Sheets

SYSTEM AND METHOD FOR INTEROPERABILITY BETWEEN FLEX APPLICATIONS AND .NET APPLICATIONS

BACKGROUND OF THE INVENTION

Web applications are applications provided to users over a network, typically the internet. A web application is typically designed to be executed by a web browser. For example, as known in the art, a web application can be downloaded as part of a web page and executed by a web browser using a plug-in application.

Adobe Flex is a technology for building web applications and is well known in the art. Adobe Flash Player and Adobe AIR runtimes are used to execute Adobe Flex applications (referred to herein as "Flex applications"). A shockwave player is a computer program or application used for executing or running Flex applications. Adobe Shockwave plug-in (also known as a shockwave player in the art) is used to execute Flex applications included or embedded in web pages. Extensible Markup Language (XML) is a markup language that defines a set of rules for encoding documents in a format that is readable for both humans and computers. MXML is an XML based user interface markup language used by programmers to develop Flex applications.

A Flex application is typically written using the Action-Script scripting language known in the art. Generally, the ActionScript scripting language is a dialect of JavaScript and is based on the MXML coding standards. An ActionScript code, program or script is compiled into a "Shock-Wave Flash" or "small web format" (SWF) file format that can be executed by a shockwave player, e.g., shockwave plug-in or a flex player as known in the art.

Adobe Flash (or Adobe Flash Platform) is a software platform useable for authoring a software cross-platform application that is executed by the known in the art Adobe Flash Player. For example, multimedia content in web pages is often presented using Adobe Flash Player. For example, Adobe Flash is frequently used to add streamed video and interactive multimedia content to web pages.

Adobe Flex (or Apache Flex), is a software development kit (SDK) used for developing and deploying cross-platform applications that are executed based on the Adobe Flash platform. Additional information related to Adobe Flex may be found, for example, at "http://en.wikipedia.org/wiki/Adobe_Flex".

The .NET framework is a software framework that enables programmers using various development tools and coding languages to produce applications that can interoperate based on the .NET framework. Additional information related to the .NET framework may be found, for example, at "http://en.wikipedia.org/wiki/.NET_Framework".

A web application included in a web page and executed by a plug-in can communicate with an application external to the web browser (referred to herein as "external applications") using Hyper Text Markup Language (HTML). However, simple, easy to implement interoperability of web applications with external applications is currently limited to predefined external functions in the Flex Application that implement a simple external interface with HTML and .NET, if any.

SUMMARY OF EMBODIMENTS OF THE INVENTION

A computer-implemented method of enabling interoperability between a Flex application included in a web page and an external application includes substituting the Flex application included in the web page with a container application, the container application including an external interface; loading the Flex application into the container application; generating, by the container application, a representation for at least one object in the Flex application; and facilitating a communication between the Flex application and the external application based on the representation of the object.

A representation of objects in the Flex application may be generated in real-time. A representation of an object in the Flex application may be generated in real-time, upon determining the object is accessed by an external application. A single representation may be used to facilitate a communication between an external application and a plurality of objects included in the Flex application. A representation may be generated based on a policy. A representation may be generated according to XML.

A monitoring unit may be provided with data related to a communication between an external application and the Flex application. A representation may be associated with a reference count and may be deleted if an associated reference count value is below a threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
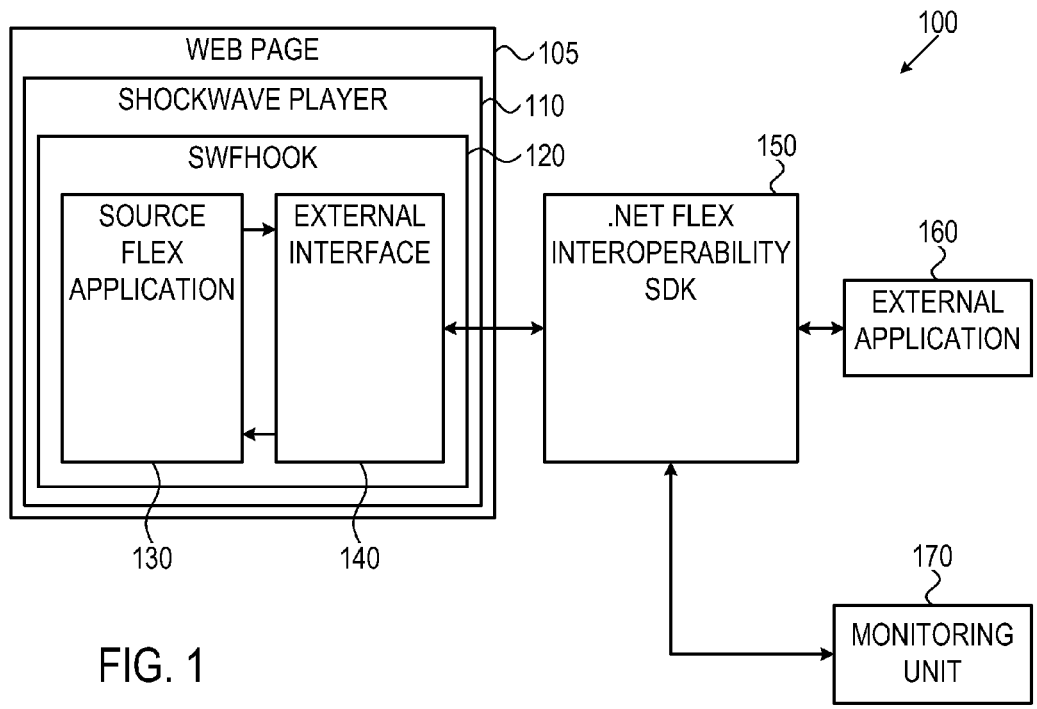
FIG. 1 shows an exemplary system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

As discussed, a Flex Application embedded (e.g., inserted as part of) in a web page can currently only interact or interoperate with external applications if it implements predefined external functions, and the interaction is limited to the predefined functions. Currently, there is no system or method that enables an external application to invoke any function in a Flex Application embedded in a web page. Currently, there is no system or method that enables an external application to access or share any variable or object defined and used by a Flex Application embedded in a web page. As described, an embodiment of the present invention enables real-time, full interaction of an external application with a Flex Application embedded in a web page. An external application as referred to herein is any application that is executed outside the framework of the Adobe Flex technology. In a typical embodiment, an external application is any application executed outside (or other than) the web browser in which a Flex application is executed by a Shockwave plug-in.

Generally, an external application as referred to herein can be any application executed on the same computer executing the Flex application or on a remote computer. For example, interoperability over a network can be established between a Flex application executed on a first computer and an external application executed on a second, geographically remote, computer.

As referred to herein, interoperability between a first and second applications includes enabling a first application to cause execution of functions in the second application, set values of variables or parameters in the second application or otherwise exchange data with the second application. Interoperability can be or can include exposing and setting parameter values and the like. Typically, interoperability includes exposing (e.g., making public) objects or items such as variables and functions defined and used by a first application to a second application. For example, embodiments of the present invention may expose objects in a Flex application to an external application to enable the external application to read and set values of variables in the Flex application, execute procedures or functions in the Flex application and so on.

Although interoperability between a Flex application and an external application using .NET is mainly referred to herein, it will be understood that according to the invention described herein, and with the relevant modifications in place, a framework other than .NET may be used, and applications other than Flex applications may be enabled to interoperate with external applications according to embodiments of the invention.

Reference is made to FIG. 1, which shows an exemplary system according to embodiments of the invention. As shown in FIG. 1, a system 100 for enabling interoperability between a Flex application and an external application includes a shockwave player 110 included in a web page 105, a SWFHook 120, a source (or original) Flex application 130 loaded (e.g., transferred into memory, or into a memory portion associated with the memory used to store SWFHook 120) into the SWFHook 120 and a universal external interface module 140 (referred to as "UEIM 140" herein). As shown, the SWFHook 120, original Flex application 130 and UEIM 140 are loaded into the shockwave player 110. As shown, system 100 includes a .NET Flex interoperability software development kit (SDK) 150 (referred to hereinafter as "NFIS 150"). As shown, system 100 may include a monitoring unit 170. Monitoring unit 170 may include a logger or recording unit and may include a large storage system or unit. In an embodiment, monitoring unit 170 may be a commercial storage or database unit. Monitoring unit may receive data from NFIS 150 and may record received data. For example, messages exchanged between external application 160 and SWFHook 120 (e.g., via NFIS 150 as described herein) may be recorded by monitoring unit 170. Accordingly, monitoring unit 170 may monitor, record or store data related to a communication between external application 160 and source flex application 130.

In an embodiment, SWFHook 120 is a computer application or executable code (e.g., as shown by executable code 425 described herein) stored in memory. As described, SWFHook 120 may be an application that is loaded into or stored in a web page, e.g., by NFIS 150 described herein. In an embodiment, NFIS 150 is a module or unit, e.g., a computer application or executable code (e.g., as shown by executable code 425 described herein).

In an embodiment, NFIS 150 loads SWFHook 120 into a web page and further substitutes an application embedded in the web page by SWFHook 120 such that the application embedded in the web page can only be interacted with via SWFHook 120. For example, any reference to an application embedded in the web page may be associated, by NFIS 150, with SWFHook 120.

Web page 105 may be any web page as known in the art, for example, any document or content downloaded by a web browser. Shockwave player 110 is a shockwave player as known in the art and shortly described herein. Web page 105 may be any web page as known in the art. Source Flex application 130 may be any Flex application as known in the art and described herein. For example, any application developed using the ActionScript language. Since the ActionScript scripting language is the predominant tool for developing Flex applications, a Flex application is also referred to in the art and herein as an ActionScript. The terms Flex application and ActionScript may be used interchangeably herein. External application 160 may be any application, e.g., developed by a programmer in developing or supporting a web site or a web application. In a preferred embodiment, a programmer uses system 100 in order to enable external application 160 to interoperate with source Flex application 130. It will be understood that the scope of the invention is not limited by the type or purpose of external application 160 or logic implemented therein.

Figure 2:
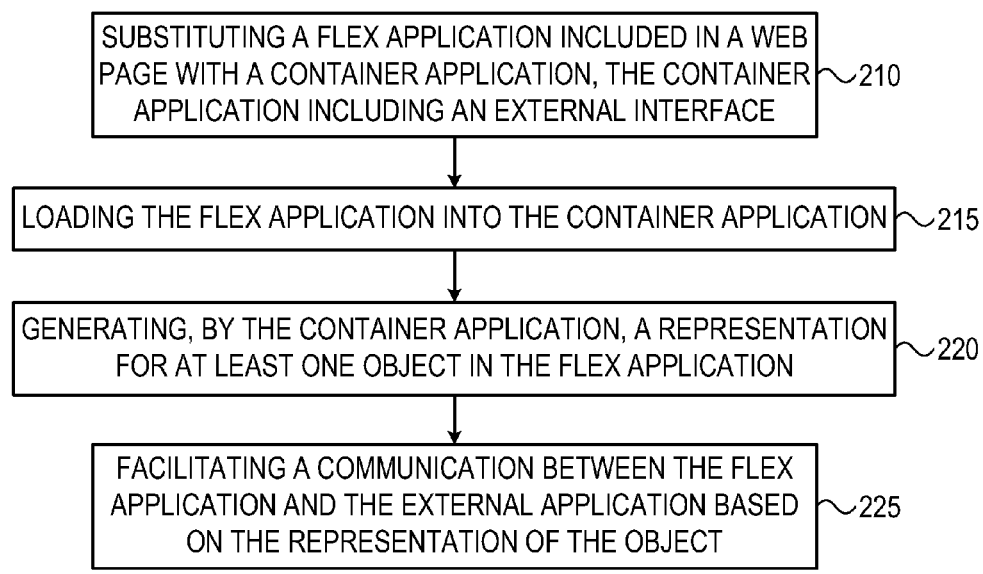
FIG. 2 is a flowchart diagram of a method according to some embodiments of the present invention.

Reference is made to FIG. 2, which shows a flowchart diagram according to an embodiment of the present invention. The method or flow shown in FIG. 2 and described herein may be a computer-implemented method of enabling interoperability between a Flex application included in a web page and an external application. The flow shown in FIG. 2 can be used to automate hooking of a Flex application in a web page, without modifying the Flex application. As described herein, using the hook and other elements described, writing .NET code that can interact with a Flex application is enabled.

As shown by block 210, the method or flow includes substituting a Flex application included in the web page with a container application, the container application including an external interface. Generally, a container application is an application that contains, includes or encapsulates another application. For example, SWFHook 120 is a container application that includes or contains source flex application as shown in FIG. 1. Typically, when a first application is contained in a container application, the first application can only be interacted with via the container application. For example, when source flex application 130 is contained in SWFHook 120 (which acts as the container application), interaction with source flex application 130 is only enabled via SWFHook 120.

For example, in an embodiment, NISDK 150 substitutes source Flex application 130 with SWFHook 120. In an embodiment, NISDK 150 loads SWFHook 120 into shockwave player 110, associates a reference previously associated with Flex application 130 with SWFHook 120 and then loads Flex application 130 into SWFHook 120. Accordingly, SWFHook 120, now containing Flex application 130 as shown, acts as the container application. Since a reference originally used to reference Flex application 130 now references SWFHook 120, SWFHook 120 now substitutes Flex application 130.

As shown, SWFHook 120 includes UEIM 140. Accordingly, substituting a Flex application included in the web page with a container application, the container application including an external interface can be performed by system 100. Further details related to the substitution of a Flex application with a container are provided with reference to FIG. 3.

As shown by block 215, the method or flow includes loading the flex application into the container application. For example, in an embodiment, NISDK 150 loads SWFHook 120 into shockwave player 110 and then loads Flex application 130 into SWFHook 120.

As shown by block 220, the method or flow includes generating, by the container application, a representation for at least one object in the Flex application. As shown by block 225, the method or flow includes facilitating a communication between the Flex application and the external application based on the representation of the object.

Figure 4:
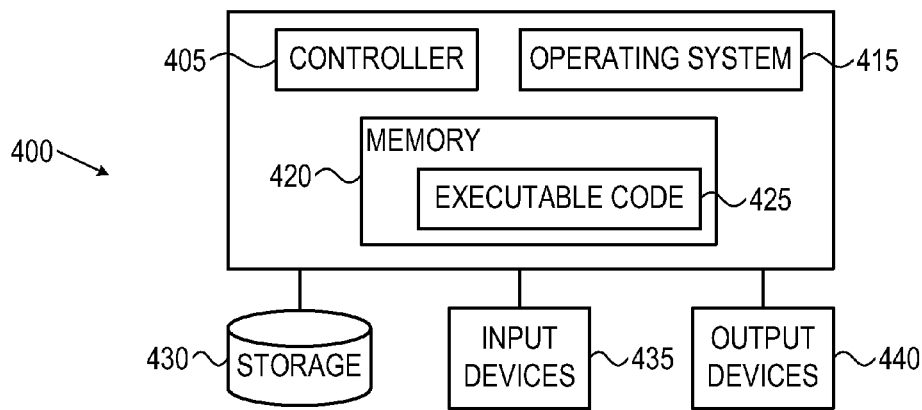
FIG. 4 shows a high level block diagram of an exemplary computing device according to embodiments of the present invention.

In an embodiment, all elements shown in FIG. 1 are executed on the same computer (e.g., the system shown in FIG. 4). Accordingly, it will be understood that elements such as UEIM 140, NISDK 150 and external application 160 may communicate as known in the art, e.g., using application programming interface (API), remote procedure call (RPC) and the like. In other embodiments, communication between elements shown in FIG. 1 may be over a computer network.

Figure 3:
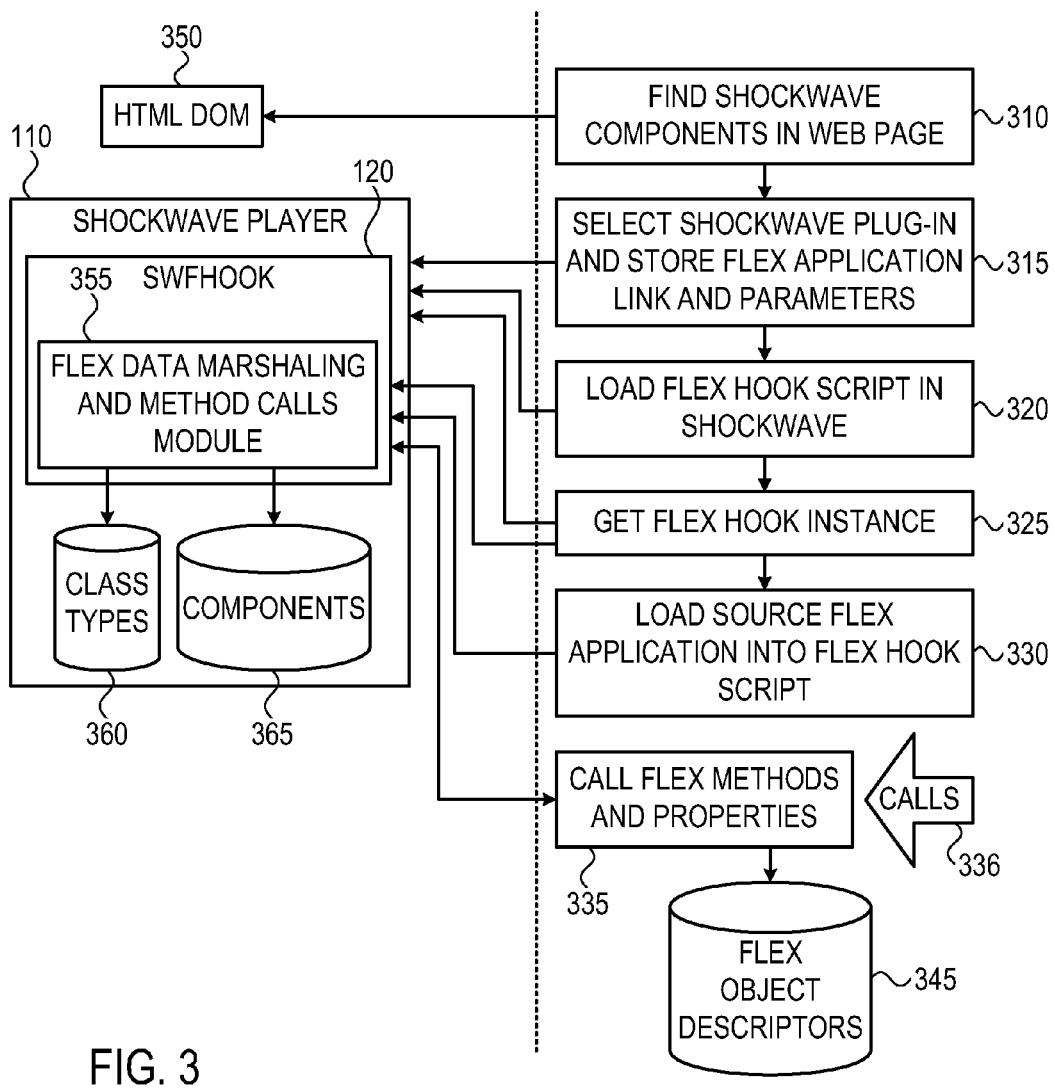
FIG. 3 is a flowchart diagram according to some embodiments of the present invention.

Reference is made to FIG. 3 that graphically shows a flow and related elements according to a preferred embodiment of the present invention. HTML Document Object Model (DOM) 350 may be a DOM of a web page downloaded by a browser (or loaded from a local disk). As known in the art, a computer program or application can examine a structure of an HTML document (or a web page) by examining the related DOM. The DOM the may be readily obtained from a browser that downloaded the web page. For example, NFIS 150 obtains a DOM of a web page from browser 105 using an API.

Accordingly, as shown by 310, in an embodiment, NFIS 150 examines DOM 350 and identifies shockwave plug-ins included in the web page. In an embodiment and as shown by 315, NFIS 150 selects a shockwave plug-in identified as described herein and stores one or more related parameters. For example, as known in the art, a Flex application included in a shockwave player is typically referenced by a uniform (or universal) resource locator (URL), accordingly, NFIS 150 may store the URL that points to a Flex application included or embedded in shockwave player 110. In an embodiment, A URL pointing to the original or source Flex application is stored in Flex object descriptors 345.

As shown by 320, SWFHook 120 is loaded into Shockwave player 110. The Adobe Flex technology enables loading an application into a flash player. Accordingly, NFIS 150 can load SWFHook 120 into Shockwave player 110 using methods well known in the art. Having obtained a reference (e.g., URL) to the source Flex application, NFIS 150 uses the reference to load the source Flex application into SWFHook 120. As known in the art, an ActionScript SDK provided by Adobe enables writing a first Flex application that embeds or includes a second Flex application to produce a combined or composite Flex application that functions as a combination of the first and second Flex applications. Accordingly, SWFHook 120 (acting as the first Flex application) is coded to load a second Flex application that is the source or original Flex application. For example, NFIS 150 provides SWFHook 120 with a URL that points to source Flex application 130 and SWFHook 120 loads source Flex application 130 into SWFHook 120. Otherwise described, hooking source Flex application 130 is achieved by loading it into SWFHook 120.

Accordingly, as shown by 325 a reference to SWFHook 120 (now loaded into shockwave player 110) is obtained. For example, SWFHook 120 interacts with Shockwave player 110 to obtain a reference to SWFHook 120. In another embodiment, since a location of SWFHook 120 (e.g., a full path on a local disk) is known the location may be used. Further and as shown by 330, a source or original Flex application (e.g., Flex application 130, for simplicity not shown in FIG. 3) is loaded into Shockwave player 110.

As shown, SWFHook 120 includes a unit 355 for marshalling data and methods in the loaded Flex application 130. In the computing industry, marshalling (or marshaling) generally relates to transforming a memory representation of an object to a format usable for storage or transmission. Unmarshaling as known and referred to in the art is the reverse of marshalling, namely, transforming a representation back to its original form.

In an embodiment, a unit as shown by 355 or code executed by SWFHook 120 examines the code of Flex application 130 that is loaded into SWFHook 120 and generates a representation for objects included in source Flex application 130. For example, by scanning the code of Flex application 130 (a simple task if Flex application 130 is an ActionScript) variables and methods in Flex application 130 are identified and recorded by code in SWFHook 120.

Any information collected or calculated by unit 355 can be stored, by unit 355, in any memory, e.g., a random access memory (RAM) installed in a computing device which executes unit 355. In an embodiment, any relevant information related to source Flex application 130 is recorded by unit 355. For example, objects types' and names of objects in Flex application 130, variables names, method input parameter types and actual values stored in variables may be obtained and stored by unit 355 in RAM. Data stored by unit 355 may be provided to NFIS 150. Accordingly, NFIS 150 may have a complete representation or view of source Flex application 130.

As shown by flex object descriptors 345, the representations of objects in a Flex application loaded into SWFHook 120 may be stored by NFIS 150 and may be used to enable an external application to interact with the Flex application. For example, in an embodiment, after a Flex application is loaded into SWFHook 120, examined as described, and objects in the Flex application are identified and characterized, a representation of the identified objects is exported to NFIS 150 that uses the exported representations in order to expose any object in the Flex application to an external application. For example, in an embodiment, NFIS 150 exposes objects in Flex application 130 to external application 160 using data in Flex object descriptors 345.

As shown by 336, a call or request to a method in a source Flex application can be received, e.g., a call from external application 160 to a method in source Flex application 130 is received by NFIS 150. As shown by 335, calls (e.g., function calls) may be received, e.g., from external application 160. Using data stored in flex object descriptors 345, NFIS 150 may be convert a call for a function in source Flex application 130 to a predefined format and may forward the converted call to SWFHook 120 (that includes a source Flex application as described herein). For example, NFIS 150 receives a call or request from external application 160, converts the call to an XML format or representation and forwards an XML representation of the call to SWFHook 120. SWFHook 120 may use a received call (in XML format) to generate a call to a method in source Flex application 130.

Accordingly, interoperability between a Flex application included in a web page and an external application is facilitated by substituting the Flex application included in the web page with a container application, that has an external interface; loading the Flex application into the container application and generating, a representation for at least one object in the Flex application.

Generating the representation for objects in a source Flex application may be performed in real-time. For example, SWFHook 120 may and NFIS 150 may only generate a representation of a method or variable in source Flex application 130 when the method is called by external application 160, e.g., when NFIS 150 receives, for the first time, a call to the method from external application 160.

In an embodiment, a single representation is used to facilitate a communication between the external application and a plurality of objects included in the source Flex application. For example, a single representation is used to generate a plurality of messages related to a respective plurality of objects included in the application.

For example, if two or more similar objects are detected or identified in source Flex application 130 then SWFHook 120 may generate a single component wrapper objects that represents both objects. The component wrapper may then be used a number of times to generate messages for both objects. Accordingly, a plurality of messages related to a plurality of objects may be generated based on a single representation or based on a single component wrapper.

As known in the art, a wrapper is generally a unit whose main purpose is to call a second unit. Otherwise described, a wrapper may mediate between a wrapped application or unit and other applications, e.g., by providing an interface or access to the wrapped application. A component wrapper as referred to herein may provide an interface to a component (the wrapped component). For example, a component wrapper may interact with external entities according to an interface defined by the component wrapper and may interact with a component according to an interface defined by the component. Accordingly, a component wrapper may be used to enable interacting with a component based on an interface defined by the component wrapper.

For example, Flex technology supports a number of Text Editor Component types. These Text Editor Component types are common by functionality but have different sets of properties and methods. A component wrapper that encapsulates all these text components into a single object, with a standard set of properties and methods to access them, may be generated and used.

In an embodiment, a representation is generated based on a policy. For example, a policy may be that not all objects in a source Flex application may be represented in flex object descriptors 345. Accordingly, not all objects in a source Flex application may be made accessible or available to an external application. For example, if, by examining the code of source Flex application 130, SWFHook 120 determines that a method in source Flex application 130 is accessing a protected resource (e.g., a specific disk drive, a protected file and the like) then SWFHook 120 may avoid generating a representation for that specific method. In another embodiment, SWFHook 120 generates a representation for all objects in the loaded source Flex application and NFIS 150 applies a policy or rule in order to determine whether or not a method, variable or other object will be exposed to an external application. Accordingly, objects in a source Flex application are selectively exposed to an external application. For example, a management application (not shown) may provide NFIS 150 with a criteria or policy that defines object types in Flex applications which are not to be exposed to external applications and NFIS 150 (or SWFHook 120) may comply with a policy by skipping a generation of a representation of objects according to the policy.

A representation of an object may be generated upon receiving a request from an external application and the representation may be according to XML standards. For example, after receiving a call as shown by 336 that may generated by external application 160 according to the .NET framework, NFIS 150 may convert the call to a call or request according to the XML standard. NFIS 150 may forward the call, in XML format, to SWFHook 120 that may cause source Flex application 130 to execute that call, e.g., perform a method referenced in the call. It will be noted that converting a call from the .NET representation to XML can be done in real-time, e.g., as the call is received from external application 160 by NFIS 150. In an embodiment, generating a representation for an object or component included in a source Flex application is performed as described herein and upon a first call related to the object. Accordingly, computing resources and storage space may be observed.

A representation of an object included in a source Flex application may be associated with a reference count. For example, in order to observe memory usage, data in components 365 and class types 360 may be deleted if or when no longer needed. For example, a reference counter associated with an object included in a source Flex application 130 is incremented each the object is accessed or referenced by external application 160. For example, upon detecting a first reference (or call) to a method in Flex application 130, code in SWFHook 120 creates a reference counter, associates it with the method and initializes the reference counter to one ("1").

The reference counter is further decremented when a reference made by external application 160 is removed, e.g., when garbage collection in external application 160 frees memory by releasing handles and other resources used by applications. If the reference counter value is less then a threshold (e.g., one ("1")), the representation is deleted from components 365 and class types 360. Data related to the representation can also be deleted from Flex object descriptors 345. For example, only a minimal representation may be kept in Flex object descriptors 345, e.g., an object name and/or type.

Any information received by NFIS 150 may be provided to any application or unit. For example, NFIS 150 may forward any request or call received from external application 160 to a monitoring or recording unit (not shown). Similarly, NFIS 150 may forward any response received from SWFHook 120 to the monitoring or recording unit. Accordingly, a session involving, or any exchange of data between, external application 160 and source Flex application 130 may be monitored and/or recorded. Accordingly any data related to a communication between an external application and a source application Flex application can be made available to any application or unit, e.g., a recording or monitoring system.

In an embodiment, initially, only references to objects in Flex application 130 are exported by SWFHook 120 to NFIS 150 and stored in flex object descriptors 345. For example, objects names and types are exported. Another parameter that may be exported at an initial phase or stage is a list of input parameters and their types. References or other parameters may enable NFIS 150 to present the referenced objects to an external application. If an object is called, additional data may be dynamically generated and provided. For example, actual values of output parameters or results of a method are dynamically stored. Accordingly, in an embodiment, generating a full or current representation of an object or component is done upon a first call related to the object or component. For example, in an embodiment, data stored in components 365 and class types 360 and provided to NFIS 150 is generated only when needed by an external application. For example, variables actual values, computation results, method return values or output may all be dynamically updated and provided by code or logic in SWFHook 120 to NFIS 150 and from NFIS 150 to external application 160.

As shown, information obtained by examination of Flex application 130 is stored in components 365 and class types 360 that may be constructs in RAM. In an embodiment, components 365 and class types 360 are implemented as memory objects dynamically allocated by SWFHook 120. Generally, any relevant information such as object name, object type (e.g., integer, short and the like) is stored in components 365 and classification information as calculated by SWFHook 120 is stored in class types 360.

Having loaded the source application SWFHook 120 generates a representation of the source application data such that properties and methods are exposed and made accessible to an external application that may use the .NET framework (e.g., external application 160). In an embodiment, code in SWFHook 120 generates a Component Object Model of the application, that includes a representation of the component hierarchy of the source Flex application (now loaded into SWFHook 120). While generating the Component Object Model, SWFHook 120 may classify objects in the source Flex application by functionality. In an embodiment, interoperability objects referred to herein as Component Wrappers are used. For example, a component wrapper may have a set of properties and methods used to access two or more objects, in a source Flex application, that have a common attribute or type.

For example, a Flex application may support a number of different text editor component types that may have similar functionality but may have different sets of associated properties and methods. An exemplary Component Wrapper TextBox may encapsulate all these text components to a single object with a standard set of properties and methods to access them (e.g., add text, delete text and the like). Each Component Wrapper may be assigned a unique reference enabling identifying and unambiguously referencing each Component Wrapper.

In an embodiment, a representation of an object is a segment of XML code or other suitable code. For example, to represent a variable in source flex application 130, a variable in an XML code segment may be used. XML variables or constructs may be used to represent or describe attributes of an object. For example, in representing a function in source flex application 130, an XML code segment may include the function's, a list of input parameters and their types and the like. A common representation of objects in flex application 130, e.g., an XML representation of objects in flex application 130 known to both NFIS 150 and SWFHook 120, may be used.

A representation of an object or component included in a Flex application may be in any applicable format. For example, in an embodiment, XML code is used to represent of objects in Flex application 130. Accordingly, a representation of an object may be in the form of XML code.

In an embodiment, both NFIS 150 and SWFHook 120 are designed or adapted to support XML. Accordingly, XML is used as a common protocol, standard or format used in order to communicate description of, and references to, objects in a source Flex application. In an embodiment, data related to objects or components as included in a source Flex application (e.g., source Flex application 130) and data related to the same objects as represented in a .NET environment may also be represented by a XML such that any data related to the objects can be communicated using a common or predefined protocol and/or format.

For example, SWFHook 120 may recognize objects based on their attributed in the source Flex application but may be unaware of their representation in .NET. Similarly, NFIS 150 may recognize the same objects based on their .NET representation. However, using XML as a common standard, SWFHook 120 and NFIS 150 may exchange any data related to objects. In an embodiment, after an object is identified in the source Flex application, it is assigned a unique identification value and any required data in the object (or related to the object) is expressed in XML. After an identification parameter or value which uniquely identifies an object in the source Flex application is provided by SWFHook 120 to NFIS 150, SWFHook 120 and NFIS 150 can exchange information related to the object using the XML representation. In an embodiment, NFIS 150 converts an XML representation of an object to a .NET representation to exchange data related to the object with external application 160. In an embodiment, SWFHook 120 converts an XML representation of an object in order to access objects as defined by the source Flex application (e.g., source Flex application 130).

As shown by 336 a call may be received by NFIS 150. For example, a call from external application 160 is received as depicted by FIG. 1. As shown by 335, NFIS 150 may direct a call to SWFHook 120. In an embodiment, having loaded a source Flex application, SWFHook 120 prepares the source Flex application exposes properties and methods to be accessible from an application developed using .NET. In an embodiment, SWFHook 120 builds a Component Object Model of the source Flex application. A Component Object Model represents an application component hierarchy of the source Flex application.

In an embodiment, SWFHook 120 generates Component Wrappers, for example, as part of the process of generating the Component Object Model. Component wrappers may include a standard set of properties and methods used to access specific component types identified in the source Flex application. For example, a Flex technology supports five Text Editor Component types that are common by functionality but have different sets of properties and methods. A Component Wrapper may encapsulate all Text Editor components into a single object with a standard set of properties and methods to access them. Each Component Wrapper may be assigned a unique identification (ID) that can be used to unambiguously refer to a specific object in the source Flex application.

In an embodiment, objects identified in the source Flex application are parsed, by code in SWFHook 120, and a representation in .NET is generated for the identified objects. For example, .NET classes or primitives are used to represent methods and variables in the source Flex application. In an embodiment, XML is used to represent methods, variables and other objects or components in the source Flex application. As discussed, XML is supported by code or logic in SWFHook 120 and in NFIS 150. Accordingly, in an embodiment, XML is used to communicate objects' representations and attributes between SWFHook 120 and NFIS 150. If real-time operation is required, NFIS 150 can, immediately upon receiving data related to the source Flex application from SWFHook 120, forward the data to external application 160. Similarly, upon receiving data from external application 160, e.g., a request to click a button displayed by the source Flex application, NFIS 150 may transfer the request or data to SWFHook 120 that may pass received data to the source Flex application. Accordingly, real-time interoperability may be achieved. SWFHook 120.

As discussed, SWFHook 120 may marshal/unmarshal data related to values, events and data types of the source Flex application as stored in RAM. AS known in the art, a software program (e.g., a Flex ActionScript) stores dynamic data (e.g., variables, instant or current value) in RAM. SWFHook 120 may marshal and/or unmarshal object representations, for example, transform a representation of an object in XML format to/from .NET format or code.

In an embodiment, NFIS 150 stores, e.g., in flex object descriptors 345, a .NET representation of properties and methods for of the source Flex application. As discussed, NFIS 150 obtains and stores link to the source Flex application and other parameters for each shockwave player instance in a web page. After loading SWFHook 120 into a selected shockwave player instance, NFIS 150 calls SWFHook 120 to reload the source Flex application, using the stored link. NFIS 150 is adapted to call or invoke any method or function in SWFHook 120.

Since components or objects in a Flex script or application have no references associated with them (as is done in environments like .NET or Java), representations, and references to, components in the source Flex application, stored in class types 360 and components container 365. In an embodiment, SWFHook 120 examines a Flex application (e.g., an ActionScript) and stores representations, and references to, components detected in class types 360 and components container 365. As discussed, a representation of an object may be removed from class types 360 and/or components container 365 based on a reference counter. When examining a Flex application loaded into SWFHook 120, SWFHook 120 associates a unique reference, or an identification code or value (also referred to as an "ID" in the art) to each object found, detected or identified in the examined Flex application. The reference is then provided to NFIS 150 along with other data, e.g., a method's name, type and input arguments.

Accordingly, NFIS 150 and SWFHook 120 can communicate with respect to a specific method, variable or object in a Flex application loaded into SWFHook 120. For example, provided with a reference to a method in source Flex application 130 and using XML formatted messages as described herein, NFIS 150 can pass a call to the method to SWFHook 120.

As discussed, XML may be used in order to communicate information between SWFHook 120 and NFIS 150. NFIS 150 converts or transforms XML formatted information to .NET format in order to present the information to external application 160. SWFHook 120 converts or transforms XML formatted information in order to interact with source Flex application 130. In an embodiment, a first XML format is used for calling functions, procedures or methods in source Flex application 130. A second XML format is used to represent function return values and also to represent individual values as function parameters.

A representation of an object may be a code segment. To further describe representation of objects discussed herein, a few examples are provided below. It will be understood that the code segments below are provided as examples, directed to further clarify representation discussed herein. For example, the code below is used to represent, in XML, a call to a function in source Flex application 130 (other code may be used):

```
<invoke name="functionName" returntype="xml">
    <arguments>
        ... (individual argument values)
    </arguments>
</invoke>
```

In an embodiment, source Flex application 130 includes at least two interface methods. A CallFunction method is implemented by source Flex application 130 to enable calling any function in source Flex application 130. A FlashCall method in source Flex application 130 is used for returning results. The CallFunction and FlashCall are well known and used in the art.

In an embodiment, call to a method or function in source Flex application 130 (received from external application 160) is formatted according to the XML standard by NFIS 150, e.g., as shown above. NFIS 150 sends the XML formatted call to SWFHook 120 that is adapted to parse the XML call, determine the actual call needed to be performed and interacts with source Flex application 130 to complete the call.

A representation of a component may be in the form of XML code. Otherwise described, XML code may be used to represent an object. For example, in an embodiment, to represent (or expose) an object, method or variable "Foo"

identified in source Flex application 130, SWFHook 120 uses a class "A", coded as shown below (other code may be used):

```
import flash.external.ExternalInterface;
...
class A {
    public function Initialize( ) : void
    {
        ExternalInterface.addCallback("MyFoo", Foo);
    }
    private function Foo( ) : int
    {
        ...
        return "abc";
    }
}
```

In this example, a call to "Foo", formatted in XML would be:

```
<invoke name="MyFoo" returntype="xml">
<arguments>
</arguments>
</invoke>
where the returned value is
<string>abc</string>
```

For example, calling "Foo" using the above format is done by attaching the above code to the CallFunction discussed briefly above. Accordingly, generating a representation for an object in an application included in a web page and providing the representation to an external application may be as shown by the code above. For example, in an embodiment, SWFHook 120 generates a representation of an object in Flex application 130 by representing the object using XML as shown above. In an embodiment, NFIS 150 stores a representation of an object (e.g., in Flex objects descriptors 345) and uses the representation in order to present the object to external application 160. In an embodiment, external application 160 uses a representation provided by NFIS 150 to generate a message.

For example, in order to set a value of an object in Flex application 130, external application 160 uses a representation of the object generated as described herein and provided by NFIS 150 to generate a message. A message may include elements such as a name of a function or object, one or more parameters and other data. For example, to call a function in flex application 130, external application 160 generates a message that includes the function name and input parameters to be used by the function when executed. In another example, to read a value of a variable in flex application 130, external application 160 generates a message the includes the variable name, in yet another example, to set a value of a variable in flex application 130, external application 160 generates a message the includes the variable name and a value to be used for manipulating the variable, e.g., change its value.

External application 160 then sends the message to NFIS 150, which may process the message and send the processed message to SWFHook 120. Based on a message received from NFIS 150, SWFHook 120 sets or creates the value of the object in Flex application 130.

Reference is made to FIG. 4, showing high level block diagram of an exemplary computing device according to embodiments of the present invention. Computing device 400 may include a controller 405 that may be, for example, a central processing unit processor (CPU), a chip or any suitable computing or computational device, an operating system 415, a memory 420, a storage 430, one or more input devices 435 and one or more output devices 440.

Operating system 415 may be or may include any code segment designed and/or configured to perform tasks involving coordination, scheduling, arbitration, supervising, controlling or otherwise managing operation of computing device 400, for example, scheduling execution of programs. Operating system 415 may be a commercial operating system. Memory 420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer or other suitable memory units or storage units. Memory 420 may be or may include a plurality of, possibly different memory units.

Executable code 425 may be any executable code, e.g., an application, a program, a process, task or script. Executable code 425 may be executed by controller 405 possibly under control of operating system 415. For example, part of executable code 425 may be an application that carries out operations performed by SWFHook 120 and another part of executable code 425 may be an application that carries out operations performed by NFIS 150 as described herein. Where applicable, executable code 425 may carry out operations described herein in real-time. It will be understood that a plurality of executable code segments similar to executable code 425 may be loaded into memory 420. For example, in an embodiment, a plurality of executable code segments similar to executable code 425 may allow be executed by controller 405 to be configured to carry out methods as described herein with reference to FIG. 2 and FIG. 3 by processing the code 425.

Computing device 400 and executable code 425 may be configured to update, process and/or act upon information at the same rate the information, or a relevant event, are received. Accordingly, methods described herein may be performed in real-time. In some embodiments, more than one computing device 400 may be used. For example, a plurality of computing devices that include components similar to those included in computing device 400 may be connected to a network and used as a system. For example, a first computing device 400 may host or execute SWFHook 120 and a second computing device 400, connected to the first device by a network, may host or execute NFIS 150.

Storage 430 may be or may include, for example, a hard disk drive, a Compact Disk (CD) drive, a universal serial bus (USB) device or other suitable removable and/or fixed storage unit. Content may be stored in storage 430 and may be loaded from storage 430 into memory 420 where it may be processed by controller 405. In some embodiments, some of the components shown in FIG. 4 may be omitted. For example, memory 420 may be a non-volatile memory having the storage capacity of storage 430. Accordingly, although shown as a separate component, storage 430 may be embedded or included in memory 420.

Input devices 435 may be or may include a mouse, a keyboard, a touch screen or pad or any suitable input device. It will be recognized that any suitable number of input devices may be operatively connected to computing device 400 as shown by block 435. Output devices 440 may include one or more displays, speakers and/or any other suitable output devices. It will be recognized that any suitable number of output devices may be operatively connected to computing device 400 as shown by block 440. Any applicable input/output (I/O) devices may be connected to computing device 400 as shown by blocks 435 and 440. For example, a wired or wireless network interface card (NIC), a modem, a universal serial bus (USB) device or external hard drive may be included in input devices 435 and/or output devices 440.

Embodiments of the invention may include an article such as a computer or processor non-transitory readable medium, or a computer or processor non-transitory storage medium, such as for example a memory, a disk drive, or a USB flash memory. For example, in an embodiment, memory 420 is a non-transitory readable medium. In an embodiment, a non-transitory memory includes or stores instructions, e.g., computer-executable instructions, which, when executed by a processor or controller, carry out methods disclosed herein. For example, a storage medium such as memory 420, computer-executable instructions such as executable code 425 and a controller such as controller 405.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

The storage medium may include, but is not limited to, any type of disk including optical disks, rewritable compact disk (CD-RWs) or magneto-optical disks. The storage medium may include random access memories (RAMs), dynamic RAM (DRAM), erasable programmable read-only memories (EPROMs), flash memories, electrically erasable programmable read-only memories (EEPROMs) or any type of media suitable for storing electronic instructions, including programmable storage devices.

A system according to embodiments of the invention may include components such as, but not limited to, a plurality of central processing units (CPU) or any other suitable multipurpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer-implemented method of enabling interoperability between a Flex application included in a web page and an external application, the method comprising:
   substituting the Flex application included in the web page with a container application by: loading the Flex application into a the container application, the container application including an external interface;
   loading the container application into a player, the player contained in the web page, wherein the player is adapted to execute Flex applications embedded in the web page;
   generating, by the container application, a representation for at least one object in the Flex application, wherein generating the representation for the object is performed in real-time;
   and providing the representation to the external application;
   receiving a message from the external application, the message generated according to the representation, wherein a single representation is used to generate a plurality of messages related to a respective plurality of objects included in the application;
   and providing the message to the Flex application.

2. The method of claim 1, comprising sending, to a monitoring unit, data related to a communication between the external application and the application.

3. The method of claim 1, comprising selectively generating a representation for an object based on a policy.

4. The method of claim 1, comprising: examining the web page to identify at least one application included in the web page; loading the at least one application into the container application; and generating an XML representation of the component included in the application in response to a message received from the external application.

5. The method of claim 4, comprising generating the representation upon a first call related to the component.

6. The method of claim 4, comprising associating a representation with a reference count and deleting the representation if the reference count value is below a threshold.

7. The method of claim 4, wherein the application included in a web page is a Flex application.

8. A system for enabling interoperability between a Flex application included in a web page and an external application, the system comprising:
   a memory; and
   a controller configured to:
   substitute the Flex application included in the web page with a container application by:
   loading the Flex application into a container application, the container application including an external interface, and
   loading the container application into a player, the player contained in the web page, wherein the player is adapted to execute Flex applications embedded in the web page;
   generate a representation for at least one object in the Flex application, wherein generating the representation for the object is performed in real-time;
   and provide the representation to an external application;
   receive a message from the external application, the message generated according to the representation, wherein a single representation is used to generate a plurality of messages related to a respective plurality of objects included in the application; and provide the message to the container application.

9. The system of claim 8, wherein the processor is configured to send, to a monitoring unit, data related to a communication between the external application and the application.

10. The system of claim 8, wherein the processor is configured to selectively generate a representation for an object based on a policy.

11. The system of claim 8, wherein the processor module is configured to:

examine the web page to identify at least one application included in the web page;

load the at least one application into the container application; and generate an XML representation of the component included in the application in response to a message received from the external application.

12. The system of claim 11, wherein the processor is configured to generate the representation upon a first call related to the component.

13. The system of claim 11, wherein the processor is configured to associate a representation with a reference count and to delete the representation if the reference count value is below a threshold.

14. The system of claim 11, wherein the application included in a web page is a Flex application.

15. A method comprising:

substituting a Flex application included in a web page with a container application by:

loading the Flex application included in a web page into a container application, the container application including an external interface;

loading the container application into a player, the player contained in the web page, wherein the player is adapted to execute Flex applications embedded in the web page;

generating, by the container application, code describing attributes of at least one object in the application, wherein generating the code describing attributes of the object is performed in real-time; and providing the code to an external application;

receiving, by the container application, a message from the external application, the message generated according to the code, wherein a single code is used to generate a plurality of messages related to a respective plurality of objects included in the application; and providing the message to the Flex application.

16. The method of claim 1, wherein the container application includes an external interface module.

17. The system of claim 8, wherein the processor is configured to load an external interface module into the player.

* * * * *